United States Patent [19]

Porter et al.

[11] 4,356,779
[45] Nov. 2, 1982

[54] FLUIDIZED BED SOLIDS FEED

[75] Inventors: James H. Porter, Martha's Vineyard; Robert Davis, Cambridge; Jehangir Zakaria, Cambridge, all of Mass.

[73] Assignee: Energy Resources Company, Inc., Cambridge, Mass.

[21] Appl. No.: 271,643

[22] Filed: Jun. 8, 1981

Related U.S. Application Data

[63] Continuation of Ser. No. 53,077, Jun. 28, 1979, abandoned.

[51] Int. Cl.³ .............................................. F23D 19/02
[52] U.S. Cl. .................................. 110/245; 110/101 R; 110/106; 110/263; 406/89; 406/181; 406/155
[58] Field of Search .......... 110/245, 244, 263, 104 R, 110/106, 101 R; 406/141, 155, 142, 146, 89, 181; 266/182, 265, 268

[56] References Cited

U.S. PATENT DOCUMENTS

| | | | |
|---|---|---|---|
| 1,787,593 | 1/1931 | Peabody | 406/155 |
| 2,666,269 | 1/1954 | Parry | 406/56 |
| 3,050,341 | 8/1962 | Whitney, Jr. | 406/100 |
| 3,265,442 | 8/1966 | Willis, Jr. et al. | 406/181 |
| 3,267,891 | 8/1966 | Hemker | 406/181 |
| 3,272,561 | 9/1966 | Farnsworth et al. | 406/181 |
| 3,411,829 | 11/1968 | Albright | 406/181 |
| 4,027,920 | 6/1977 | Wennerstorm | 406/181 |
| 4,309,948 | 1/1982 | Zielinski | 110/245 |
| 4,325,327 | 4/1982 | Kantesania et al. | 110/245 |

Primary Examiner—Henry C. Yuen
Attorney, Agent, or Firm—George L. Greenfield; Milton Oliver

[57] ABSTRACT

A fluidized-bed system for feeding coal or a coal-limestone mixture into a fluidized bed combustor, a perforated horizontal distributor plate dividing the chamber into upper and lower chamber sections, means for feeding solid fuel particles into the upper chamber section, a source of high velocity gas connected to the lower chamber section and passing through the plate into the upper chamber section for entraining the particles, means for heating the high velocity gas before it is introduced into the upper chamber, an entrainment section defined by converging upper sides of said fuel feeding chamber, and a stream splitting section disposed above said entrainment section and connected to a plurality of pneumatic transport lines each penetrating the distributor plate of a fluidized bed combustor and terminating in an outlet feedport.

4 Claims, 3 Drawing Figures

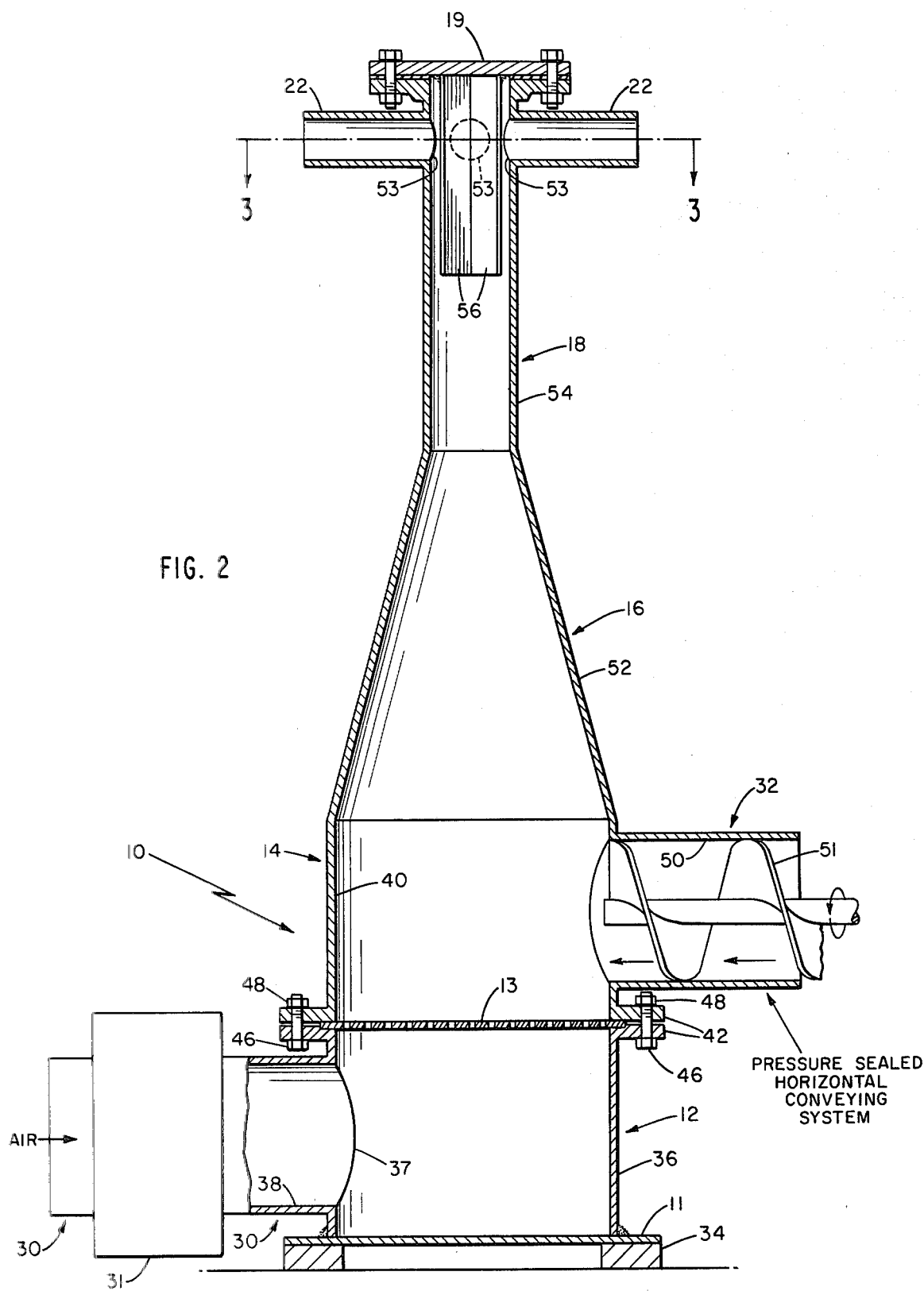

FLUIDIZED BED SOLIDS FEED

This application is a continuation of application Ser. No. 053,077, filed June 28, 1979, abandoned.

BACKGROUND OF THE INVENTION

The subject of the present invention is a system for feeding materials into a fluidized-bed combustor, and more particularly, a feed system which itself incorporates a fluidized bed.

In recent years, the nation has turned increasingly to the use of coal to meet its energy needs and lessen dependence on imported fuels. However, the burning of coal containing sulphur threatens to produce levels of air pollution dangerous to public health and harmful to property. The use of stack gas scrubbers to remove the sulphur from power plant exhausts has been widely regarded as an expensive and unreliable solution to this problem.

The alternative of burning coal mixed with a sulphur fixing agent such as limestone or dolomite in a fluidized bed, i.e., a suspension of particles in an upward airstream, has been seen as a potentially superior solution, since it removes the sulphur before it gets into the exhaust gases. However, making fluidized-bed combustors reliable and cost competitive with conventional boilers requires an improved method of feeding the fuel into the combustion chamber.

A prior art feed system, disclosed in U.S. Pat. No. 4,130,071 dated Dec. 19, 1978 and entitled "Fluidized Bed Combustor", and commonly assigned with the present application, utilizes a comparatively complex and expensive array of air sources for entraining the fuel particles to be fed. Particles are fed through slide valves into a series of ducts having air sources at spaced intervals along their bottoms.

In the present invention, the initial entrainment of the fuel particles is accomplished with a single air source feeding into an air plenum section of a fuel feeding chamber and then through holes in a distributor plate, creating in effect a plurality of separate air sources in the fluidization section of the chamber.

Accordingly, it is a primary object of this invention to simplify the construction of a fluidized-bed fuel feeding system for a fluidized-bed combustor.

It is a further object of this invention to more precisely regulate the rate at which fuel particles are fed into such a system. It is yet another object of this invention to utilize the Venturi effect in maintaining a suspension of fuel particles in a fluidized-bed system.

Because this invention incorporates a fluidized bed in itself, and because of the fact that wet solids can be more readily and efficiently dried in a fluidized state, it is yet another objective of this invention to utilize the fluidization phenomenon for drying the wet particles prior to their injection into a fluidized-bed combustor. Those familiar with the practical problems associated with feeding wet particles will appreciate this aspect of the invention.

FEATURES OF THE INVENTION

To accomplish these and other objects, the fluidized-bed feed system of this invention has among its many features a fuel feeding chamber, preferably cylindrical, disposed beneath or adjacent to a fluidized-bed combustor. The chamber is subdivided into upper and lower sections by a horizontally disposed perforated distributor plate. The lower section or air plenum has an inlet for compressed gas, which passes through the distributor plate into the upper fluidization section and fluidizes coal or coal and limestone particles introduced into that section by a pressure sealed horizontal conveying system and disperses the particles horizontally and vertically across the bed. Converging upper side walls of the upper section define an entrainment section in the chamber, which is connected in turn to a stream splitting section, preferably a cylinder of smaller diameter than the fluidization section. Vertical partitions or vanes split the rising stream of particles into equal substreams, each of which is forced into a pneumatic transport line. Each pneumatic transport line passes up through the horizontal distributor plate of the fluidized-bed combustor and terminates in an outlet feedport above the plate.

In operation, as the coal or coal and limestone particles are fed into the fluidization section of the feed chamber, compressed air enters the air plenum and flows through the holes in the distributor plate, fluidizing the particles and dispersing them. In the case of wet coal or coal and limestone particles, the compressed air will be heated by an external source such as heater 31 before its entry into the fluidization section. The hot compressed air, as it fluidizes the particles for subsequent entrainment, also absorbs the undesirable moisture content of the coal or coal and limestone particles. Since the horizontal particle conveying system is pressure-sealed, the only outlet for the compressed air is through the pneumatic transport lines, and the operation of the Venturi principle in the narrowed section above the fluidized section increases the velocity of the air enough to cause it to entrain the fluidized coal or coal and limestone particles. These particles remain entrained while passing through the pneumatic transport lines and are scattered into the combustion section of the fluidized-bed combustor. During combustion, the particles are fluidized by air flowing up through the combustor distributor plate from the air plenum of the combustor.

BRIEF FIGURE DESCRIPTION

Other objects, features and advantages will appear from the following description of a preferred embodiment of the invention, as shown in the attached drawings, which:

FIG. 2 is a fragmentary cross-sectional view of the coal feeding chamber and parts of the connected pneumatic transport lines.

DETAILED DESCRIPTION OF THE DRAWINGS

Figure 1:
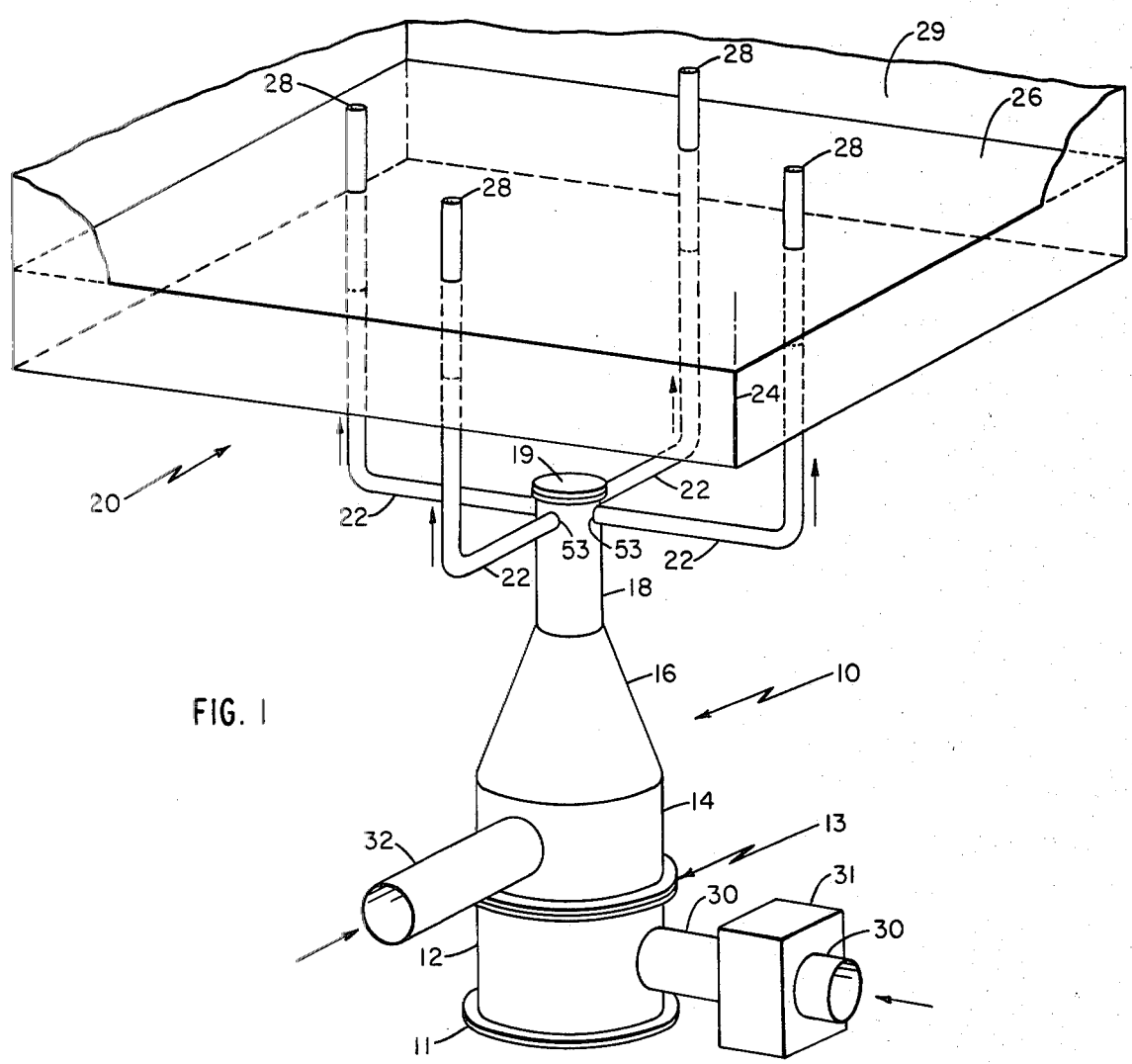
FIG. 1 is a perspective view of a fluidized-bed coal feed system beneath a fluidized bed combustor. The portion of the combustor shown is schematically illustrated.

There is shown in FIG. 1 a fluidized-bed coal feed 10 mounted beneath a fluidized-bed combustor 20. The feed 10 is depicted as cylindrical and the combustor 20 as rectangular, but other configurations are, of course, possible.

The largest component of the feed 10 is the chamber shown in FIG. 2 and comprising four vertically stacked sections, namely, a lower air plenum section 12, a fluidizing section 14, a frusto-conical entrainment section 16 and a stream-splitting section 18. A perforated distributor plate 13, preferably of steel, separates the lower air plenum section 12 from the fluidizing section 14. A horizontal base plate 11 seals the lower end of the chamber beneath plenum section 12, while cover 19 of the stream-splitting section 18 seals the upper end of the chamber.

One of more pneumatic transport lines 22 lead from outlets in stream-splitting section 18 outward and into fluidized-bed combustor 20. As shown in FIG. 1, there are four such lines at right angles to each other running horizontally and radially from section 18, then turning upward through the bottom wall of the combustor air plenum section 24 and combustor distributor plate 26 and terminating in outlet feedports 28 in the combustion section 29 of the combustor.

Also shown in FIG. 1 are a heater 31 on an air supply line 30 to the coal feed air plenum section 12 and a solid fuel supply line 32 to fluidization section 14. These are depicted as entering the feed chamber horizontally at right angles to each other but the spacing is arbitrary and they could also be arranged at some other angle or in parallel.

As shown in more detail in FIG. 2, base plate 11 is a solid metal sheet which typically may be approximately 16" (40.6 cm) in diameter and ¼" (6 mm) thick. For heat insulation purposes, it may be supported on one or more grouting or mounting pads 34. Welded to the base plate 11 is a cylindrical wall 36 which forms the air plenum section 12. In the side of this cylinder is cut a hole 37, the edges of which are welded to pipe 38 defining the air supply line 30, which may be fed by a conventional positive displacement air blower (not shown). Also shown in FIG. 2 is an air heating device 31 which may be located at some convenient point in the air supply line between the blower and the distributor plate 13 of the said feed system. Typically the heating capacity of such a device may be 400,000 BTU/hr. The air heater may be supplied by conventional heating fuels such as oil and gas, or it may consist of a heat exchanger supplied with hot process exhaust gases or process steam. Preheating of compressed air may not be essential for low moisture content feed, however. Such a blower can generate in the plenum 12 an overpressure of approximately 4 pounds/square inch (275 millibars). This results in a 5–10 ft/sec (1.5–3 m/sec) airflow in the fluidization section above.

Welded to the outside upper rim of air plenum wall 36 and the outside lower rim of wall 40 of fluidization section 14 are a pair of flanges 42 separated by an asbestos gasket (not shown) and fastened together via vertical holes by bolts 46 and nuts 48. An inner peripheral notch is machined in facing edges of the flanges 42 to receive and support the distributor plate 13. The distributor plate may be perforated by dozens of regularly spaced ⅛" (3 mm) holes for passing air into the fluidization section 14. The air sources fluidize the solid feed particles in section 14 in addition to the desired drying in the case of wet feed, making them behave like a rapidly boiling liquid.

Cylindrical wall 40 of fluidizing section 14 is also pierced by and welded to a horizontal pipe 50, in this case defining a solid fuel supply line 32, which is part of a conventional pressure-sealed horizontal conveying system which includes screw feeder 51. That system may also include a hopper (not shown) of coal pulverized to no more than ¼" (6 mm) in diameter. For achieving mechanical agitation and thus breaking of lumps of conglomerates of wet coal or coal and limestone particles formed as a consequence of the surface moisture in these particles, the screw 51 may extend horizontally all the way across the fluidizing section 14, to wall 40 of this section. Alternatively, a separate mixing screw (not shown) may be provided in the fluidization section. The operation of breaking the formed lumps into smaller sizes enhances the process of drying because of the increased particle surface area available for moisture evaporation, and facilitates fluidization for subsequent entrainment because of smaller particle sizes. The system when supplied with hot air may remove by evaporation surface moisture having up to 10% of the weight of the dry coal or coal and limestone mixture feed. Mechanical agitation in the fluidizing section 14 may not be required for low moisture content feeds. The system may feed from 650 lb. to 4,000 lb. (295 kg to 1,815 kg) per hour of solids. Wall 40 is welded at its upper rim to converging side wall 52 of entrainment section 16. Wall 52 is typically high and conical, tapering from a wide lower diameter to a narrower upper diameter. Walls 40 and 52 and pipe 50 are preferably of an abrasion resisting metal such as Brinell 220 quenched and tempered alloy.

The vertical reduction in cross-sectional area in section 16 with a constant air volume combine according to the Venturi effect to accelerate the air stream velocity to at least 50 ft/sec (15.2 m/sec), entraining the fluidized coal or coal and limestone particles.

Figure 3:
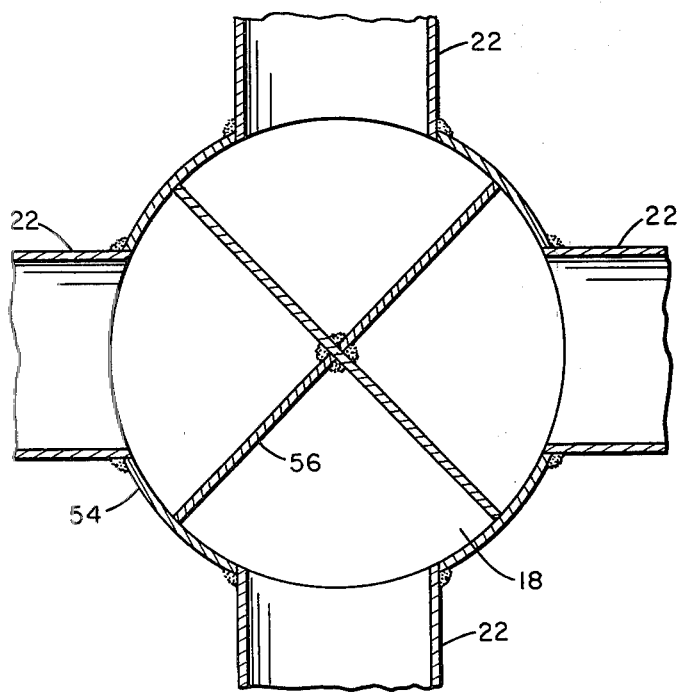
FIG. 3 is a cross-sectional view along line 3—3 of FIG. 2, showing the arrangement of vanes and pneumatic transport lines in the stream splitting section.

The upper edge of wall 52 is welded to wall 54 of stream-splitting section 18. For ease in fabrication or changes in the number of outlet feedports, section 18 may be assembled separately and attached with another flange-gasket-bolt assembly (not shown) like that between walls 36 and 40, but this is not essential. Section 18 is sealed with bolts, flange and gasket at the top to the cover 19, which is preferably of 125# carbon steel or some like material. Welded to cover 19 are depending radial vanes 56, which split the stream of air and particles in section 18 into equal substreams. As shown in FIG. 3, the vanes 56 in the preferred embodiment are arranged at 90° to each other and at 45° to the axes of the horizontal pneumatic transport lines 22.

The pneumatic transport lines 22 may typically be pipes welded to holes 53 cut at even intervals around the circumference of wall 54 and below the top of cover 19. The diameter of line 22 preferably is at least four times the size of particles being fed, but small enough to produce a flow velocity of over 70 ft/sec (21.5 m/sec). The precise length and configuration of the lines depends on whether the fluidized bed combustor they feed is above or alongside the feed system.

The present invention is superior to conventional coal feed systems because of its low pressure drop, low operating costs, compactness, easy interchangeability of parts, and ease of fabrication from standard pipes and fittings. Only one air supply line is required, compared with the curved ducting required in prior art feed systems, such as shown in U.S. Pat. No. 4,130,071.

From the foregoing description, those skilled in the art will appreciate the numerous modifications may be made in this invention without departing from its spirit. Therefore, we do not intend to limit the scope of this invention to the single embodiment illustrated and described. Rather, it is our intention that the scope of this invention be determined by the appended claims and their equivalents.

What is claimed is:

1. A fluidized-bed combustor comprising
a combustion chamber and a distributor plate disposed in said chamber,
a plurality of fuel outlet feedports, evenly spaced across the surface of, and vertically penetrating, said distributor plate,
an air plenum beneath the distributor plate of the combustion chamber, and
a fuel feeding system for directing fuel into the combustion chamber through said distributor plate from below, said system including
a fuel feeding chamber having a distributor plate dividing the chamber into air plenum and fuel fluidization sections, an air feed line connected to the air plenum of the fuel feeding system and a fuel particle feed line connected to the fluidization section for fluidizing fuel in the system, and
transport lines interconnecting the fluidization section and the combustion chamber for carrying fluidized fuel via apertures in the distributor plate of said fluidized bed combustor to said combustion chamber.

2. A fluidized bed combustor as set forth in claim 1, further characterized by
an entrainment section connected between the fluidization section and the transport lines of said fuel feeding system for increasing the velocity of the flow of the fluidized fuel from the system to the combustion chamber.

3. A fluidized bed combustor as set forth in claim 2, further characterized by
said air plenum, fluidization section and entrainment section of the fuel feeding system being vertically stacked one above the other,
said air plenum and fluidization section being cylindrical in shape and the entrainment section being upwardly tapered.

4. A fluidized bed combustor as set forth in claim 3, further characterized by
a stream splitting section connected to the top of the entrainment section,
said transport lines being connected directly to the stream splitting section,
and baffles in the stream splitting section for directing the flow of the fluidized fuel into each of the lines.

* * * * *